(12) United States Patent
Wisk et al.

(10) Patent No.: US 6,220,060 B1
(45) Date of Patent: Apr. 24, 2001

(54) OPTICAL FIBER MANUFACTURE

(75) Inventors: Patrick William Wisk, Greenbrook; James Dennis Wynn, Plainfield; Man Fei Yan, Berkeley Heights, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,432

(22) Filed: Apr. 8, 1999

(51) Int. Cl.[7] .................................................. C03B 37/02
(52) U.S. Cl. ............................ 65/435; 65/385; 65/384; 65/399; 65/413; 65/416; 65/417; 65/419; 65/420
(58) Field of Search .......................... 65/435, 385, 384, 65/399, 413, 416, 417, 419, 420

(56) References Cited

U.S. PATENT DOCUMENTS 5,868,815 * 2/1999 DiGiovanni .............................. 65/382

* cited by examiner

Primary Examiner—Stanley S. Silverman
Assistant Examiner—Mark Halpern
(74) Attorney, Agent, or Firm—Thomas, Kayden, Horstemeyer & Risley LLP; Peter V. D. Wilde

(57) ABSTRACT

The specification describes a process and apparatus for collapsing preform tubes in Modified Chemical Vapor Deposition processes. The problem of bubble formation during tube collapse was found to be attributable to excess dopant vapor pressure emitted from the hot zone during the final stage of tube collapse. This excess pressure is controlled by cooling the tube in advance of the torch, thereby decreasing the viscosity of the dopant vapor and increasing its transport rate. This is found to reduce internal tube pressure and eliminate bubble formation in the collapsed preform.

15 Claims, 2 Drawing Sheets

OPTICAL FIBER MANUFACTURE

FIELD OF THE INVENTION

This invention relates to optical fiber manufacture and more specifically to improved preform fabrication techniques.

BACKGROUND OF THE INVENTION

The manufacture of optical fiber typically uses one of two fundamental approaches. Both use rotating lathes, and accumulate pure glass material on a rotating preform by chemical vapor deposition or a modification thereof. The earliest technique deposited material on the outside of a rotating preform, and the preform usually started as a hollow tube with a slowly increasing diameter as the vapor deposited glass material accumulated on the outside of the solid tube. A significant advance in this technology occurred with the introduction of the so-called Modified Chemical Vapor Deposition (MCVD) process of MacChesney et al. in which the glass forming precursers are introduced into a rotating hollow tube and the glass material is deposited on the inside wall of the hollow tube. In this way exceptionally pure material can be produced at the critical core region. It also allows better control over the reaction environment.

The MCVD process has evolved to a highly sophisticated manufacturing technique and is widely used in commercial practice today. However, problems in the tube collapse phase of the MCVD process persist. One of those is the spontaneous formation of a bubble in the core of the preform near the end of the collapse cycle. The bubble essentially destroys the preform. From 5–10% of preforms typically suffer this fate.

The dopant used to increase the core index in most commercial MCVD preforms is germanium in the form of $GeO_2$. Studies of the bubble formation phenomenon have established that the source of the bubbles is GeO vapor from the $GeO_2$ in the doped core. GeO vapor is emitted during the entire collapse cycle but as collapse proceeds the internal tube pressure due to accumulated GeO vapor increases, sometimes to the point where it exceeds the surface tension of the softened silica tube. When that occurs the tube wall distorts in a bubble, and there is no satisfactory way of reversing the distortion. Such tubes are scrapped, resulting in a significant reduction in process yield and substantially increased cost. Collapse techniques which avoid bubble formation would represent an important advance in the commercial practice of MCVD.

PRIOR ART

Many techniques for controlling the thermodynamics of the collapse process have been proposed in the prior art. For example, U.S. Pat. No. 5,868,815, issued Feb. 9, 1999, describes a preform collapse process that employs a gas jet of air impinging on the hot zone, where the torch softens the glass, to control ovality as the preform collapses. U.S. Pat. No. 5,160,520, issued Nov. 3, 1992, describes using jets of air in the hot zone to control the temperature profile in the hot zone. In each case the gas jets contact the preform where the glass has been softened and is susceptible to deformation.

SUMMARY OF THE INVENTION

We have developed a technique for eliminating bubble formation due to excessive GeO vapor pressure in the MCVD preform tube during the final stages of collapse. Cooling means are provided just ahead of the torch used for collapse. Resulting cooling of the preform tube increases the rate of transport of the GeO vapor thereby eliminating the source of the bubble.

DETAILED DESCRIPTION

Figure 1:
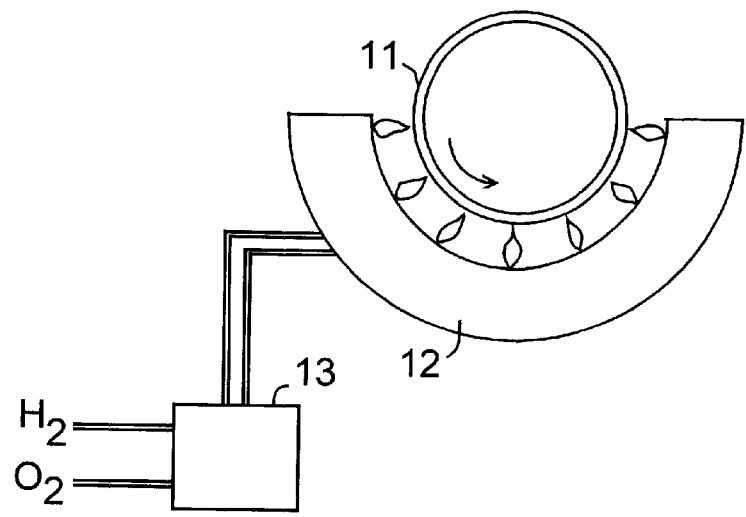
FIG. 1 is a diagram of an MCVD apparatus useful in practicing the invention.

The basic MCVD process is well known, as is the equipment used in the process. See for example, J. B. MacChesney et al., "Preparation of Low Loss Optical Fibers Using Simultaneous Vapor Phase Deposition and Fusion", Xth Int. Congress on Glass, Kyoto, Japan (1973) 6–40. As seen in FIG. 1, the silica tube 11 is mounted for rotation in an MCVD glass lathe (not shown). Glass precursor gases, e.g. $SiCl_4$, $GeCl_4$, $O_2$, are passed down the rotating tube while the tube is heated with an oxy-hydrogen torch 12. When deposition and consolidation are complete the tube is collapsed by known techniques, i.e. heating the tube to well above the glass softening temperature, i.e. >2000–2400° C. to allow the surface tension of the glass tube to slowly shrink the tube diameter, finally resulting, after multiple passes of the torch, in the desired solid preform. The temperature of the torch is controlled by the ratio of hydrogen to oxygen, and their absolute flow rates in the fuel mixture supplied to the torch. The gas flow control, shown at 13 in FIG. 1, controls the flow rate of $H_2$ and 02 independently, and thus the ratio of hydrogen to oxygen, and the resulting metered gas streams are supplied to the torch 12. The gases are mixed at the flame according to well known techniques.

In the MCVD process, the last deposited soot layer is typically silica doped with $GeO_2$, the latter for increasing the refractive index of the silica in the core of the preform. We have observed experimentally that at the last torch pass during the collapse, a section of the substrate tube evolves into a large glass bubble. We have demonstrated experimentally that the bubble formation is due to the vaporization of $GeO_2$ dopant in the core region. The silica tube collapse is conducted at very high temperatures, sufficient to soften the silica glass and allow the tube to collapse in a controlled fashion under the influence of surface tension on the glass surface. However, these temperatures are also high enough to vaporize significant amounts of $GeO_2$ and form GeO vapor. When the transport rate of the GeO vapor from the hot zone of the collapsing tube is less than the vaporization rate, an internal pressure develops in the tube. Bubbles form when this internal pressure exceeds the capillary force due to the silica surface tension.

Figure 2:
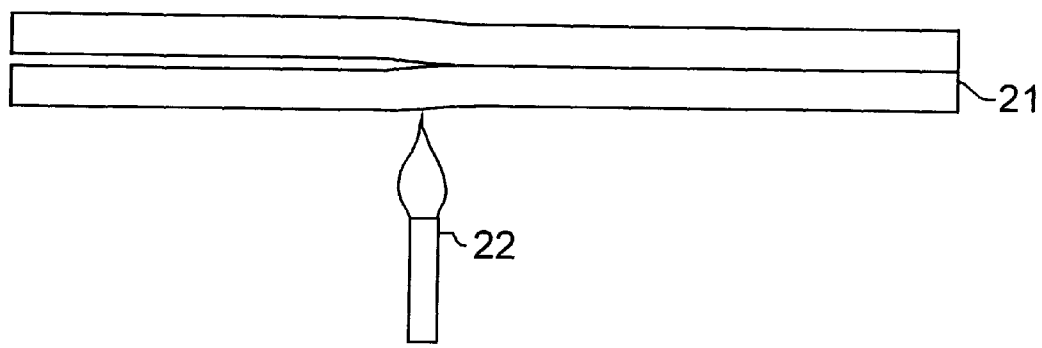
FIGS. 2–4 are schematic representations demonstrating the development of a bubble during the late stages of preform collapse.
Figure 3:
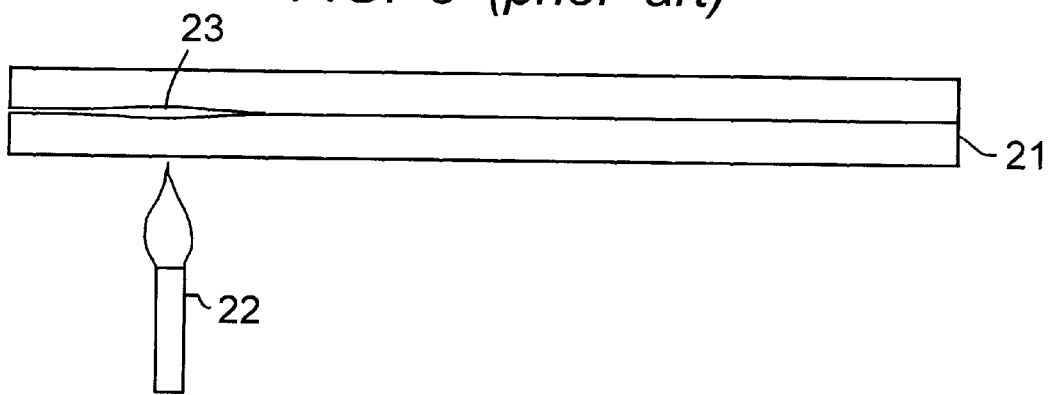
Figure 4:
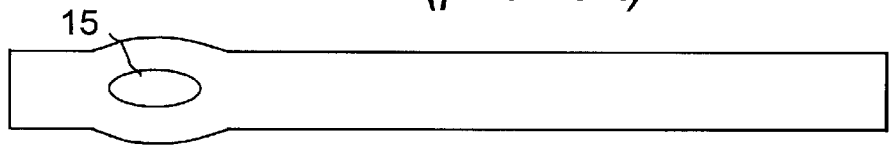

These effects are illustrated by FIGS. 2–5. FIG. 2 shows the silica glass preform 21 and the traversing torch 22, wherein the preform is in the final stage of collapse, i.e. during the last torch pass. These figures are schematic diagrams and the torch is a schematic representation of an apparatus more fully described by FIG. 1. In FIG. 2, part of the preform is shown properly collapsed. As the final pass proceeds, as shown in FIG. 3, vaporization of GeO begins to exceed the transport rate of GeO vapor in region 23 of the tube and a bulge develops. FIG. 4 shows the tube after completion of the final pass, wherein the GeO vapor is entrapped in the tube and a large bubble 15 has formed.

It is known from Chemical Engineering textbooks, e.g. page 46 in "Transport Phenomena" by R. B. Bird, W. E. Stewart and E. N. Lightfoot, John Wiley and Sons, Inc. NY 1966, that at a given vaporization rate, Q, of GeO from $GeO_2$, the internal pressure or the pressure difference $P_L-P_0$, across a transport distance, L, is given as Equation (1):

$$P_L - P_0 = \frac{8}{\pi} \frac{L}{R_i^4} Q\mu$$

where $R_i$ is the radius of the substrate opening and $\mu$ is the viscosity of the GeO vapor phase inside the substrate tube.

The above internal pressure is constrained by the capillary force, $F_{CAP}$, due to the silica surface tension, and the capillary force is given as Equation (2):

$$F_{cap} = \gamma \left[ \frac{1}{R_i} + \frac{1}{R_o} \right]$$

A bubble forms when the internal pressure exceeds the capillary force, i.e., Equation (3):

$$\frac{8}{\pi} \frac{L}{R_i^4} Q\mu > \gamma \left[ \frac{1}{R_i} + \frac{1}{R_o} \right]$$

It is further known that the vapor phase viscosity has a temperature dependence given as Equation (4):

$$\mu = \mu_0 T^{0.64874}$$

where $\mu_0$ is the material-dependent constant.

The rate of $GeO_2$ evaporation, Q, is related to the core burn-off radius, r, as well as the $GeO_2$ dopant concentration, the core delta, $\Delta$, and the torch traverse velocity V. The evaporation rate is given as Equation (5):

$$Q = Q_0 r^2 V T \Delta$$

Figure 5:
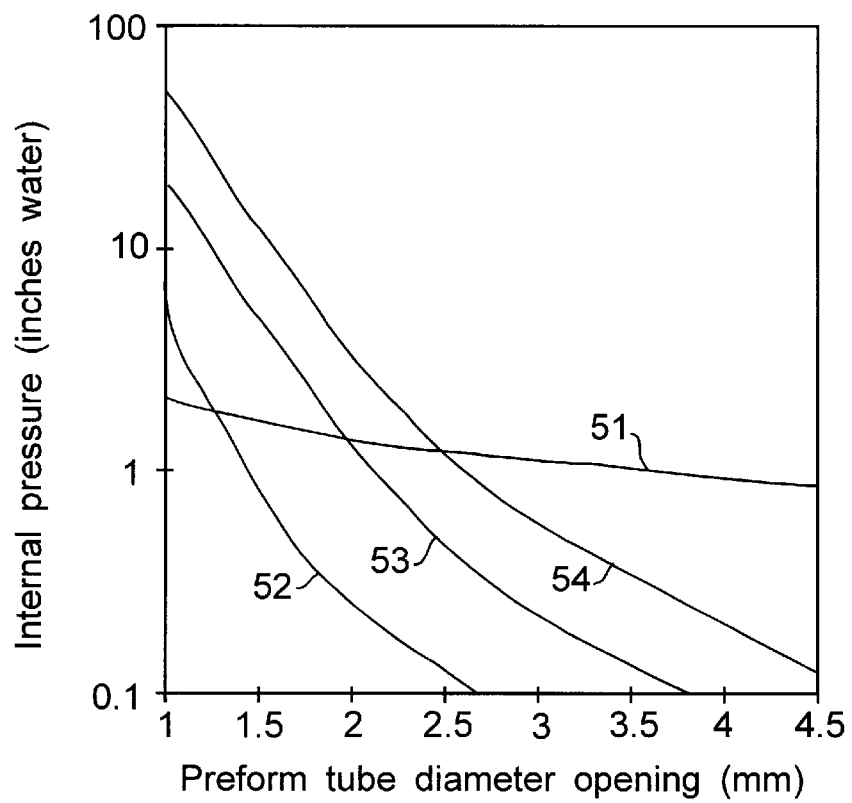
FIG. 5 is a plot showing the internal preform tube pressure for preforms with different tube diameters.

Based on the above equations, the internal pressure at three different core burn-off radii, as well as the capillary force, versus the diameter of the preform tube opening is related as shown in FIG. 5. FIG. 5 shows the conditions where bubble formation becomes most likely, i.e. when the internal tube pressure becomes excessive. The data is for a preform tube having a core delta of 0.3%. The torch traverse speed was 10 mm/min. Curve 51 represents the silica tube surface tension. Curve 52 gives data for a 2 mm burn-off radius. Curve 53 gives data for a 4 mm burn-off radius, and curve 54 gives data for a 6 mm burn-off radius. It is shown that that bubbles are likely to occur when the substrate tube opening is less than 1.5–2.5 mm diameter.

Given this understanding of the bubble forming mechanism, several options for eliminating or reducing bubble formation can be considered: (i) the MCVD preform tube opening can be kept large; (ii) the torch velocity can be reduced; (iii) the burn-off radius can be kept small; and (iv) the collapse temperature can be reduced. These expedients reduce the internal pressure in the preform tube and reduce or prevent bubble formation.

However, each of the expedients enumerated above carry significant disadvantages. For example, the risk of core ovality increases when the tube is collapsed with a large opening. Core ovality can produce unwanted polarization-mode dispersion (PMD) and excessive splice loss. A slower torch velocity increases process time and decreases productivity. Limiting the burn-off radius also increases process time and reduces throughput, as does a lower collapse temperature.

Figure 6:
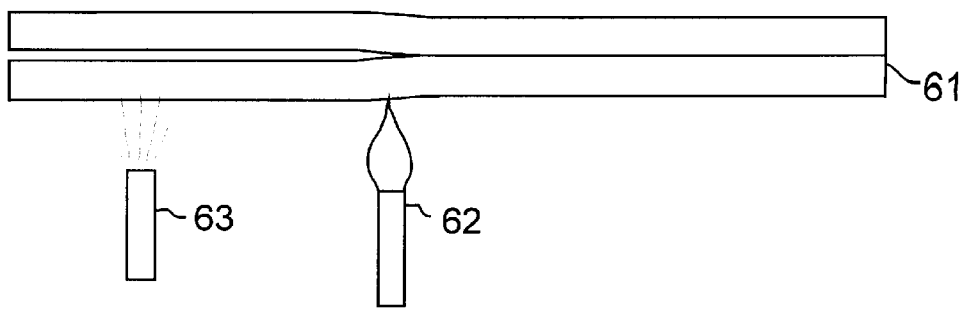
FIG. 6 is a schematic diagram showing the addition of a cooling means in association with the heating torch to increase the GeO transport rate from the hot zone during preform tube collapse.

The preferred solution, according to the invention, is to increase the rate of GeO vapor transport from the hot zone in the preform tube. This can be achieved by reducing the temperature of the preform tube in advance of the heating torch, which reduces the viscosity $\mu$ of the GeO vapor and, as evident from Equation (1), proportionally reduces the internal tube pressure. The temperature of the preform ahead of the torch can be reduced by positioning a cooling jet in advance of the heating torch as shown schematically in FIG. 6. In FIG. 6, the preform tube is indicated at 61, the heating torch at 62, and the cooling jet at 63. The cooling jet can be an air jet, or a jet of an inert gas, e.g. $N_2$. The flow rate of gas from the cooling jet will depend on the temperature of the gas and the apparatus. These can easily be determined by those skilled in the art, and will typically be in the range 20 to 50 liters/min.

Studies have shown that when the tube temperature is reduced from 1600° C., to 1400° C., the internal pressure in the preform tube is reduced by 17%. More importantly, the GeO vapor condenses to a solid state at a lower temperature. The effect of the cooling jet also reduces loss of germania from the preform core and helps control the well known index depression effect due to excessive germania loss.

While FIG. 6 schematically shows a single gas nozzle or jet 63, multiple nozzles can be used and placed at other locations around the tube diameter. One or more gas jets may also be incorporated into the torch assembly so that the movement of the cooling jet ahead of the heating torch is easily coordinated with the movement of the torch. The distance between the gas jets for the traversing heat source and the gas jets for the cooling means will typically be in the range 10 to 15 cm.

Although the process as described above uses a flame torch and a fuel of mixed oxygen and hydrogen, plasma torches using, for example, a microwave plasma ring, can also be used in MCVD processes. Also gas torches other than oxy-hydrogen torches can be used. The process of the invention involves providing a cooling means ahead of the heat source regardless of the heat source used.

In the foregoing description, the dopant used in the core was $GeO_2$. Other dopants, e.g. $P_2O_5$, $B_2O_3$, and $Al_2O_3$, cause similar bubble forming problems. Accordingly, the invention is not to be construed as limited to any species of dopant.

The heat source and the cooling means of the invention are described herein as traversing the tube. As recognized in the art, this relative motion can be achieved by moving either the heat source/cooling means or the tube.

The temperature of the air or other gas from source 63 is at room temperature, or at most is substantially less than the softening temperature of the glass tube. A cooled gas supply can also be used, e.g. nitrogen from a liquid nitrogen supply. The application of cooled gas to the tube ahead of the hot zone is found not to interfere with the collapse rate of the preform tube.

While the use of externally applied cooling gas applied to the exterior of the tube ahead of the torch is effective, and is a preferred embodiment of the invention, the designer may choose to use internally applied cooling gas to achieve the objectives of the invention. To implement this embodiment the nozzle 63 is simply placed inside the rotating tube. This alternative can also be implemented by cooling the oxygen and chlorine gases introduced into the interior of the tube to control water contamination of the preform tube during collapse. The flow rate of these gases may also be increased for more effective cooling.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Method for the manufacture of optical fiber comprising the steps of:
    a. forming a glass preform by the steps of:
        i. flowing glass precursor gases through a heated preform tube to deposit glass material on the inside of the preform tube,
        ii. applying a traversing heat source to a first portion of the the preform tube to heat the first portion of the preform tube to above its softening temperature while rotating the preform tube to collapse the preform tube into a solid preform, and while moving said traversing heat source from one end of said tube to the other,
        iii. cooling a second portion of the preform tube by flowing gas onto the outside of the preform tube, said second portion of the preform tube being ahead of the first portion of the preform tube by a distance of at least 10 cm, and
    b. drawing said preform into an optical fiber.

2. The method of claim 1 in which the flowing gas is applied by at least one gas jet that traverses the tube ahead of said traversing heat source.

3. The method of claim 2 in which the flowing gas is air.

4. The method of claim 2 in which the flowing gas is nitrogen.

5. The method of claim 2 in which the flowing gas is cooled to a temperature below room temperature.

6. The method of claim 2 wherein the said gas jet and the traversing heat source are moved together.

7. The method of claim 1 wherein said precursor gases include at least one dopant selected from the group consisting of $GeO_2$, $P_2O_5$, $B_2O_3$ and $Al_2O_3$.

8. Method for the manufacture of an optical fiber preform comprising the steps of:
    a. flowing glass precursor gases through a heated preform tube to deposit glass material on the inside of the preform tube,
    b. applying a traversing heat source to a first portion of the the preform tube to heat the first portion of the preform tube to above its softening temperature while rotating the preform tube to collapse the preform tube into a solid preform, and while moving said traversing heat source from one end of said tube to the other,
    c. cooling a second portion of the preform tube by flowing gas onto the outside of the preform tube, said second portion of the preform tube being ahead of the first portion of the preform tube by a distance of at least 10 cm.

9. The method of claim 8 in which the flowing gas is applied by at least one gas jet that traverses the tube ahead of said traversing heat source.

10. The method of claim 9 in which the flowing gas is air.

11. The method of claim 9 in which the flowing gas is nitrogen.

12. The method of claim 9 in which the flowing gas is cooled to a temperature below room temperature.

13. The method of claim 9 wherein the said gas jet and the traversing heat source are moved together.

14. The method of claim 8 wherein said precursor gases include at least one dopant selected from the group consisting of $GeO_2$, $P_2O_5$, $B_2O_3$ and $Al_2O_3$.

15. The method of claim 8 in which the heat source is a flame.

* * * * *